United States Patent [19]
Bäckström

[11] Patent Number: 5,734,708
[45] Date of Patent: Mar. 31, 1998

[54] OPTIMIZING THE CAPACITY A TELECOMMUNICATION SYSTEM

[75] Inventor: Sven Gunnar Nils Bäckström, Nacka, Sweden

[73] Assignee: Telefonaktiebolaget LM Ericsson, Stockholm, Sweden

[21] Appl. No.: 731,123

[22] Filed: Oct. 9, 1996

Related U.S. Application Data

[63] Continuation of Ser. No. 375,429, Jan. 18, 1995, abandoned.

[30] Foreign Application Priority Data

Jan. 25, 1994 [SE] Sweden ................................. 9400209

[51] Int. Cl.$^6$ .............................................. H04M 3/42
[52] U.S. Cl. ........................... 379/201; 379/204; 379/243
[58] Field of Search ................................. 379/201, 207, 379/204, 112, 92.03, 93.17, 243

[56] References Cited

U.S. PATENT DOCUMENTS

| | | | |
|---|---|---|---|
| 4,567,323 | 1/1986 | Lottes et al. | |
| 4,627,046 | 12/1986 | Bellamy | 379/94 |
| 4,897,866 | 1/1990 | Majmudar et al. | 379/201 |
| 5,337,351 | 8/1994 | Manabe | 379/201 |
| 5,377,186 | 12/1994 | Wegner | 379/201 |
| 5,402,477 | 3/1995 | McMahan | 379/201 |
| 5,425,097 | 6/1995 | Pula | 379/201 |
| 5,440,625 | 8/1995 | Akiyama | 379/201 |

FOREIGN PATENT DOCUMENTS

| | | |
|---|---|---|
| 576 864 | 1/1994 | European Pat. Off. |
| 578 964 | 1/1994 | European Pat. Off. |

OTHER PUBLICATIONS

Technical Specification GSM 02.04, Version 3.7.1, ETSI, Feb. 1992.

*Primary Examiner*—Ahmad F. Matar
*Attorney, Agent, or Firm*—Burns, Doane, Swecker & Mathis, L.L.P.

[57] ABSTRACT

In a telecommunication system, the functionality is separated into basic functionality and supplementary functionality. In this system, a plurality of users subscribe to basic functions and supplementary functions. Furthermore, interaction supplementary functions are included for solving interaction problems appearing when more supplementary functions interact. For optimizing the capacity in such a system, only those supplementary functions and interaction supplementary functions that can be possible in a particular telecommunication case are added to the basic function in the telecommunication case aided by a table of information. The information includes subscriber information for each user relating to the supplementary functions subscribed to by the user, permit information for each subscribed supplementary function relating to whether the function in question takes an active or a passive state, and information with respect to the interaction supplementary functions which should be used for a given set of supplementary functions.

14 Claims, 8 Drawing Sheets

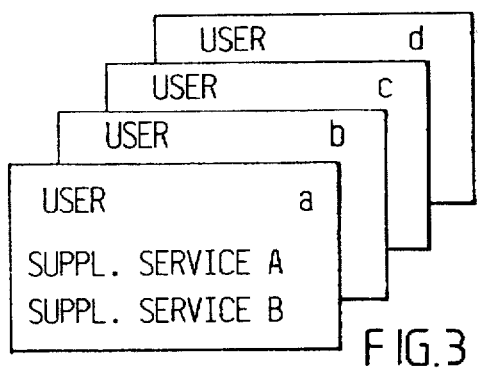
FIG. 3
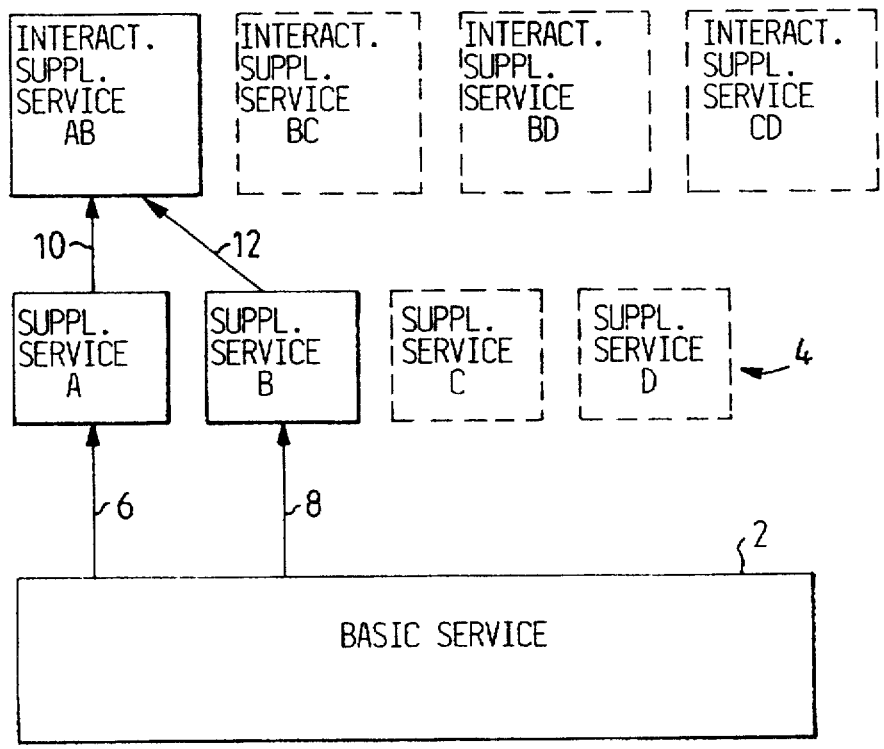
FIG. 4
FIG. 5

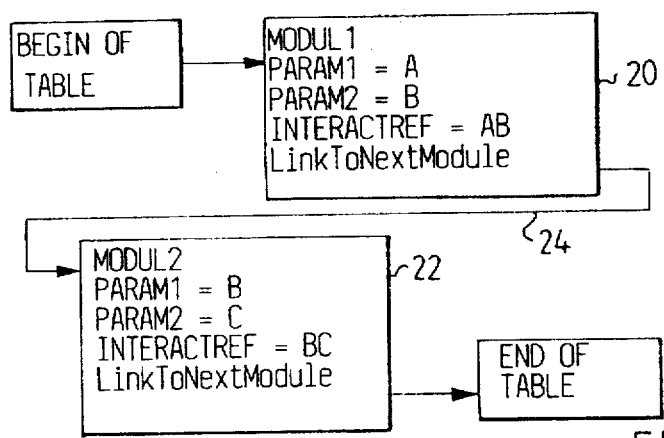
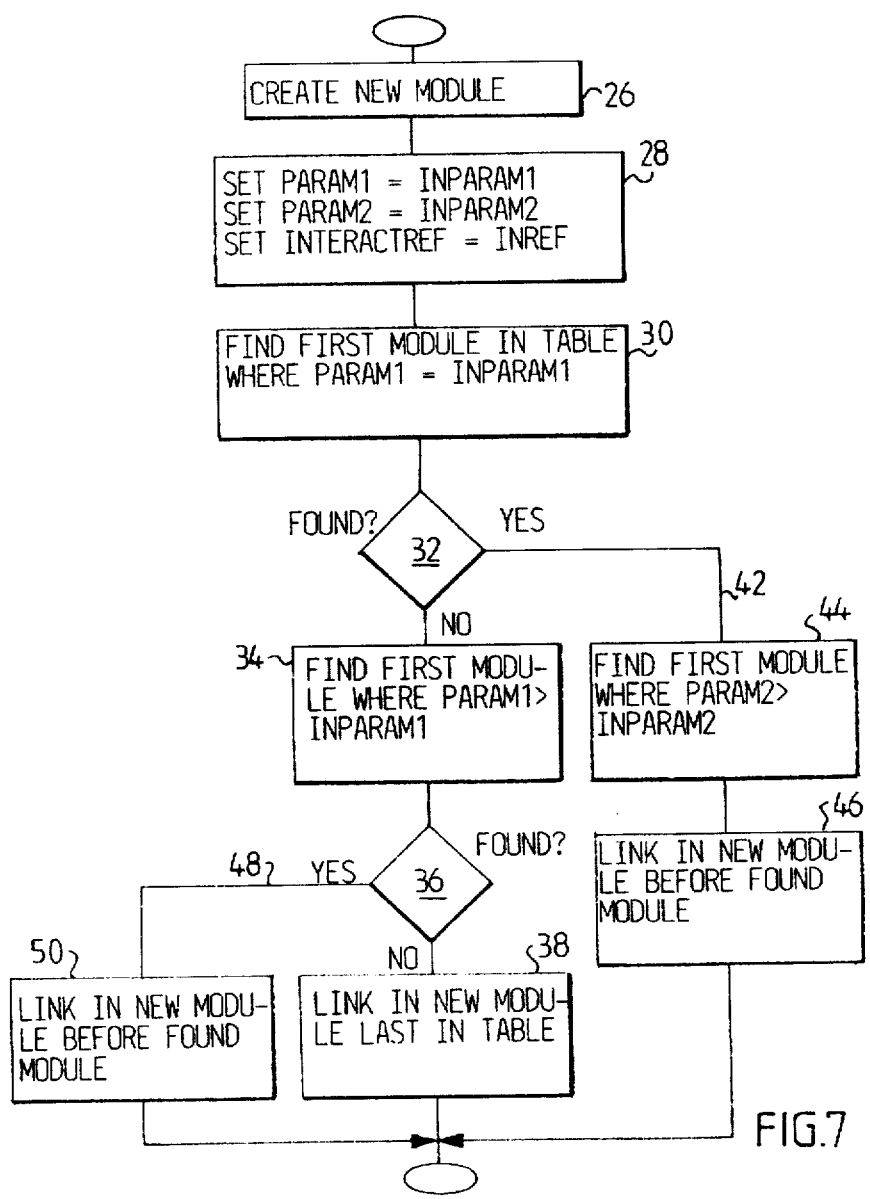
FIG.6
FIG.7

OPTIMIZING THE CAPACITY A TELECOMMUNICATION SYSTEM

This application is a continuation of Application No. 08/375,429, filed Jan. 18, 1995 (now abandoned).

BACKGROUND

The present invention generally relates to a telecommunication system having functionality including basic functionality, supplementary functionality containing optional supplementary functions associated with said basic functionality, and interaction supplementary functionality containing functions for solving interaction problems in case several supplementary functions interact. Below, such a telecommunication system will be referenced to as a telecommunication system of the kind here intended.

More particularly, the invention relates to a method used in such a system for adding supplementary functions and interacting supplementary functions needed in a current communication case initiated by a user subscribing to basic functions and supplementary functions in said system.

Different users within one and the same telecommunication network have demands on different services. Different markets may also have different demands on how to implement one and the same service.

In order that a telecommunication system may be able to offer a great number of services in a particular market and a great number of services in another market, the functionality in a telecommunication system is now usually separated into basic functionality and supplementary functionality. The basic functionality includes the basic functions common to many markets whereas the supplementary functionality consists of optional supplementary functions which may be selected in a particular market.

As a result, the telecommunication system consists of a number of basic functions and a number of supplementary functions for a particular market. The supplementary functions have the character of being an addition to or modifying a basic function. A user may choose to use either a basic function or to use a basic function modified by one or several supplementary functions, but may never use a supplementary function only.

A great number of users are connected to a telecommunication system. The users may choose to subscribe to certain supplementary functions. Thereby they have the possibility of using these supplementary functions together with the basic functions, whereas they may not use other supplementary functions.

After an operator of a telecommunication network has installed a particular service a subscriber on the service may activate (or deactivate) a corresponding function by entering a key sequence. The function will then perform certain measures for the users. A call demand is thus activated by lifting the telephone ear piece. 'Call Forwarding' is a supplementary function which when activated passes on calls destined for the user, for which the service is provided, to an alternative destination. Another example of a supplementary function is 'Call Waiting', which queues calls to a busy telephone.

Since supplementary functions have the character of modifying a basic function it may occur that two different supplementary functions modify a basic function in a contradictory way if the two supplementary functions are used simultaneously. A known way of solving such a conflict is to design the supplementary functions so as to interact with each other for solving the conflict. As an example the supplementary functions 'Call Forwarding on Busy' and 'Call Waiting' may be mentioned. 'Call Forwarding on Busy' is a variant of 'Call Forwarding' passing on a call if the user is busy. 'Call Waiting' will instead, as mentioned above, queue calls for the busy user. The two supplementary functions must thus interact for coming to an agreement. Both may e.g. be applicable but if the original destination answers first, the call to the alternative destination will be stopped, and if the alternative destination answers first the call will be removed from the 'Call Waiting' queue.

Problems of this kind, called interaction problems since they occur when two or more supplementary functions interact, may also be solved by introducing a new supplementary function which is supplementary to the two supplementary functions and which modifies these so as to attain a desired function when the supplementary functions are simultaneously activated. The new supplementary function will here be denominated interaction supplementary action.

The concepts basic functions and supplementary functions, in the meaning here used, as well as interactions are well known to the man of the art. Shortly, each basic function and supplementary function consists of a code executed by computers in the telecommunication system. "Connection" of a desired supplementary function is performed by a jump instruction in the code of the executed basic function.

Recommendations with respect to basic functions and supplementary functions, as well as a description thereof, are found e.g. in the GSM system. Thus, reference may e.g. be made to the recommendation 02.04 as concerns the above mentioned denominations, such as 'Call Waiting' etc., of some different supplementary functions.

In addition to a description of the supplementary functions which may be exposed to interaction problem there is also a description of the interaction in question and its effect.

Usually a telecommunication system is designed so as to arrive, as the basic function is run through, to a number of points in which supplementary functions are connected. When the basic function arrives at these points the subscriber information of the user is read so as to decide if the supplementary function shall be executed or not. If the supplementary function shall be executed, a number of points in the supplementary function will be arrived at, to which interaction supplementary functions are connected. In each of these points the subscriber information of the user is read to decide if the user subscribes to the supplementary function interacting with the supplementary function in question.

As the number of supplementary functions in a telecommunication system increases, the number of readings of subscriber information will be very large, which will decrease the capacity of the telecommunication system.

U.S. Pat. No. 4,897,866 discloses a telecommunication system in which the user in a simple way can modify (add/remove) his personal supplementary services. From his terminal the user can select single services or combinations thereof. When the choice is ready it is sent to a central unit having in a memory program algorithms for these services. Thereafter these algorithms are sent to the terminal of the user and are stored there. Each conceivable combination of services has a unique set of algorithms.

U.S. Pat. No. 4,567,323 relates to a telecommunication system which can offer a number of supplementary services. In order to be able to offer several services without the different services interfering with each other, each user subscribing to supplementary services is assigned a memory in which the services are stored together with the number of the user. The user activates one or more services by entering a particular code corresponding to the service/services.

U.S. Pat. No. 4,627,046 discloses a programmable "feature card" intended to be used in a telephone exchange. The card contains a program memory and a data memory, as well as a processor executing the algorithms in the program memory in dependence of control signals from the telephone exchange.

SUMMARY

The object of the present invention is to optimize, in a telecommunication system of the kind here intended, the capacity by decreasing the amount of necessary readings of subscriber information at execution of a current communication case.

The method according to the invention for adding supplementary functions and interacting supplementary functions needed in a current communication case initiated by a user subscribing to basic functions and supplementary functions in said system, comprises the following steps.

In real time, only those supplementary functions and interaction supplementary functions are added which can be possible for use in the telecommunication case in question, while using table information structured in a particular way. More particularly this table information includes subscriber information for each user relating to supplementary functions to which the user has subscribed, state information for each supplementary function subscribed to relating to whether the function in question takes an active or a passive state, as well as information regarding interaction supplementary functions which should be used together with a given set of supplementary functions. The table information may be in the form of two tables, viz. one for the subscriber and state information, and one for the information regarding interaction supplementary functions.

After the identity of the user has been established, the user's subscriber information and state information is read for finding the user's active supplementary functions coming into question for use in the telecommunication case. The information thus found is used for reading the above mentioned information regarding interaction supplementary functions for finding interaction supplementary functions coming also into question for said telecommunication case.

The supplementary functions found may be added to the basic functionality either before the interaction supplementary functions have been found, or together with the interaction supplementary functions after they have been found.

The invention optimizes the capacity in a telecommunication system in which the number of supplementary functions and the number of interaction supplementary functions is large, but in which each user subscribes to a small number of services.

DESCRIPTION OF THE DRAWINGS

An embodiment of the invention will now be described more closely below with reference to the attached drawings, on which FIG. 1 in the form of a block diagram illustrates how a telecommunication system is divided into basic functionality and supplementary functionality, FIG. 2 in an extension of the block diagram according to FIG. 1 illustrates that interactions between supplementary functions in the telecommunication system are solved by means of interaction supplementary functions, FIG. 3 shows a table containing subscriber information for all users, FIG. 4 shows a table containing information with respect to connections between supplementary functions and interaction supplementary functions, FIG. 5 in a similar block diagram as in FIG. 2 illustrates an example of supplementary functions and interaction supplementary functions connected in accordance with the invention in a telecommunication case, FIGS. 6–15 are used for illustrating more in detail an example of use of the invention, wherein FIG. 6 shows a table which in greater detail than in FIG. 4 shows information with respect to association between supplementary functions and interaction supplementary functions, FIG. 7 shows a flow diagram illustrating installation of a new interaction supplementary function, FIG. 8 illustrates how the table according to FIG. 6 has been changed after the installation according to FIG. 7, FIG. 9 shows the appearance of the same table after the installation of a further interaction supplementary function, FIG. 10 in greater detail than in FIG. 3 shows a table with information regarding supplementary functions of subscribers, FIG. 11 is a flow diagram illustrating assignment of a new supplementary function to a subscriber, FIG. 12 shows how the table according to FIG. 10 has been changed after the assignment according to FIG. 11 of the new supplementary function, FIG. 13 is a flow diagram illustrating how the new supplementary function assigned in accordance with FIGS. 11 and 12 is activated for a subscriber, FIG. 14 shows how the table with information regarding supplementary functions of subscribers has been changed after the activation according to FIG. 13.

DETAILED DESCRIPTION

Figure 1:
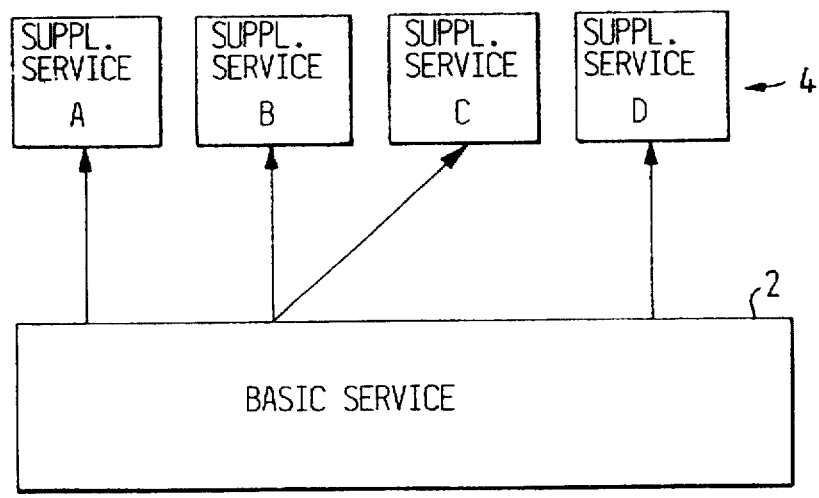

FIG. 1 generally illustrates how a basic functionality 2 may have a certain supplementary functionality 4 connected to it in a telecommunication system. For the purpose of illustration letter designations A, B, C, D . . . are used for designating supplementary functions. For the sake of explanation it is assumed further on in connection with description of flow diagrams that A<B<C<D . . . , i.e. that the supplementary functions have been mutually ranked.

Figure 2:
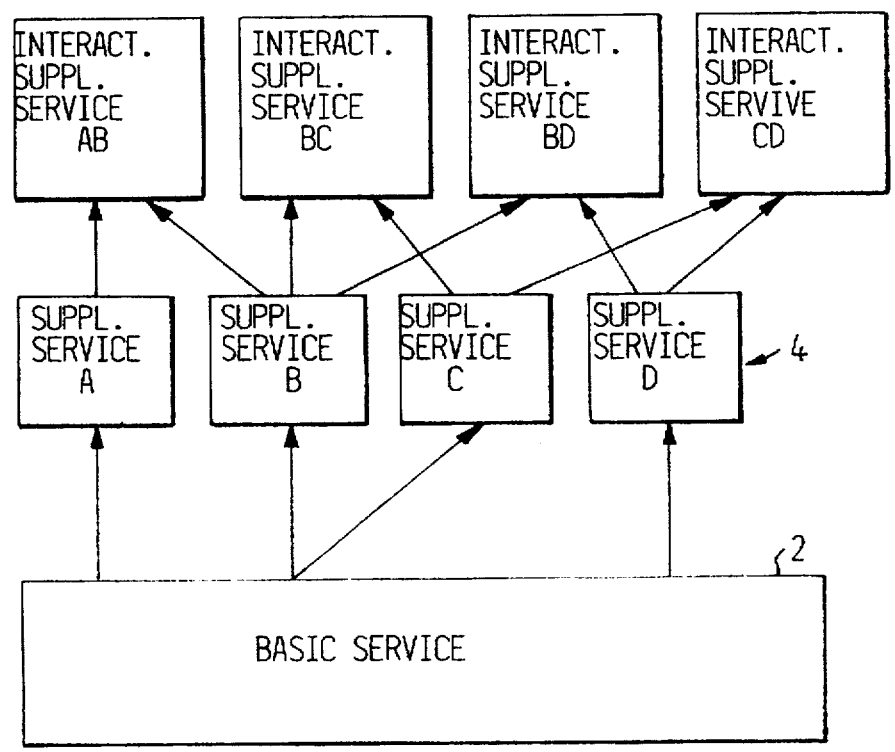

The supplementary functionality is shown, as an example, to include four supplementary functions A, B, C and D. With reference to FIG. 2 possible interactions between the supplementary functions A and B, B and C, B and D, and C and D are solved by means of interaction supplementary functions, designated AB, BC, BD and CD, respectively, corresponding to the supplementary functions in question. It also appears from the Figures that there are no interactions between all supplementary functions, as an example there is no interaction between the supplementary functions A and C or A and D.

In accordance with the invention the capacity consumption in a telecommunication system of the kind illustrated by means of FIGS. 1 and 2 shall be optimized by means of table information including, on the one hand, subscriber information for each user, and, on the other hand, information with respect to interaction supplementary functions of interest to be used for a particular set of supplementary functions. An example of such a table information will be described more closely below with reference to FIGS. 3 and 4. More particularly, the table information is used so as to connect in real time, in a current telecommunication case, only the supplementary functions and interaction supplementary functions which may be possible in this telecommunication case. This is illustrated below with reference to FIG. 5.

FIG. 3 shows a table containing subscriber information for a number of users, viz., as an example, user a, user b, user c and user d. For each user the table in FIG. 3 contains information regarding supplementary functions to which the user in question subscribes. As an example it is shown that the user a subscribes to supplementary functions A and B. As will be described more closely below the table in question for each subscribed supplementary function will also include information with respect to whether the function in question takes an active or a passive state, i.e. if the user has activated the supplementary function or not. Whether taking one or the other state is determined by the subscriber, e.g. after consideration with respect to whether he has really the need of using the function during a certain period of time.

FIG. 4 shows a table containing information regarding connections between the supplementary functions A, B, C and D and the interaction supplementary functions AB, BC, BD and CD shown in table 2. For a certain combination of supplementary functions the interaction supplementary functions to be connected are pointed out. If e.g. a user subscribes on the supplementary functions A and B, and if both are activable, also the interaction supplementary function AB shall be included in the telecommunication system.

In FIG. 5 it is illustrated, as an example, what happens if the user a requests a telecommunication case to be executed. At start of the telecommunication case, the subscriber information for the user a is read in the table according to FIG. 3, ending in the supplementary functions A and B being connected to the basic function 2 according to arrows 6 and 8. Thereafter the table in FIG. 4 is read for determining the interaction supplementary functions to be connected, which in turn ends in the interaction supplementary function AB being connected to the supplementary functions A and B according to arrows 10 and 12. In accordance with the invention no other supplementary functions and interaction supplementary functions are connected.

Here an example of use of the invention will be described more in detail with reference to FIGS. 6–15.

The language used in these Figures is based upon a pseudocode which may easily be translated to a real program language.

The example is based on the following prerequisites:

In a telecommunication system included in the example there are supplementary functions A, B and C, as well as interaction supplementary functions AB and BC. A subscriber 12345 has the supplementary functions A and B which both are activated.

FIG. 6 shows a table with information regarding association between supplementary functions and interaction supplementary functions included in the telecommunication system in question. The table contains two modules 20 and 22, respectively, which are linked to each other according to arrow 24. The first row in each of the modules 20 and 22 identifies the module, i.e. the module 20 is Modul 1 and the module 22 is Modul 2. The next two lines in the modules identify the included supplementary functions, i.e. A and B in module 20 and B and C in module 22. More particularly each supplementary function is identified in each of the modules as being the value of a parameter Param 1 and Param 2, respectively.

The next line in the modules 20 and 22 identifies the respective interaction supplementary function AB and BC. More particularly the interaction supplementary functions are indicated as being the value of a parameter Interactref. The last line in each module indicates the link to a next module, if any, by LinkToNextModule.

Starting from the state according to FIG. 6 and from the fact that a new supplementary function D has been installed in the telecommunication system, the installation of two new interaction supplementary functions CD and BD necessitated by the installation of the supplementary function D will be described with reference to FIG. 7.

When the new interaction supplementary function is installed in the telecommunication system the interaction table according to FIG. 6 is called by means of the parameters Inparam1=C, Inparam2=D, and Interactref=CD. In the first step in the flow chart in FIG. 7, having the reference character 26, the creation of a new module is activated. In the next step, step 28, the module parameter Param1 is set to the value Inparam1, Param2 is set to the value Inparam2 and Interactref is set to the value Inref. As appears from the above just stated prerequisite these parameter values are C, D and CD, respectively.

In step 30 the first module in the interaction supplementary table where Param1=Inparam1, is looked for. The result of the search, step 32, is in the case in question that no such module is found, leading to step 34 in the flow diagram, which implies that the first module is looked for, where Param1 is greater than Inparam1. The result of this search, step 36, is in the case in question that no module in the table according to FIG. 6 is found where Param1 is greater than Inparam1, i.e. C. In the next step, step 38, the new module is therefore linked in last in the table. The result is that the table according to FIG. 6 is increased according to FIG. 8 with a Modul 3, 40, containing the respective parameter values C, D and CD.

FIG. 7 also shows alternative flow paths deviating from the prerequisite in the present example. If the module looked for in step 30 is found, a flow path 42 is followed, in which the first step, step 44, consists in finding a module where the value of the parameter Param2 is greater than Inparam2, e.g. an existing parameter E. In this case the new module 40 in FIG. 8, will according to step 46 be linked in before the already existing module, that has been found.

Figure 8:
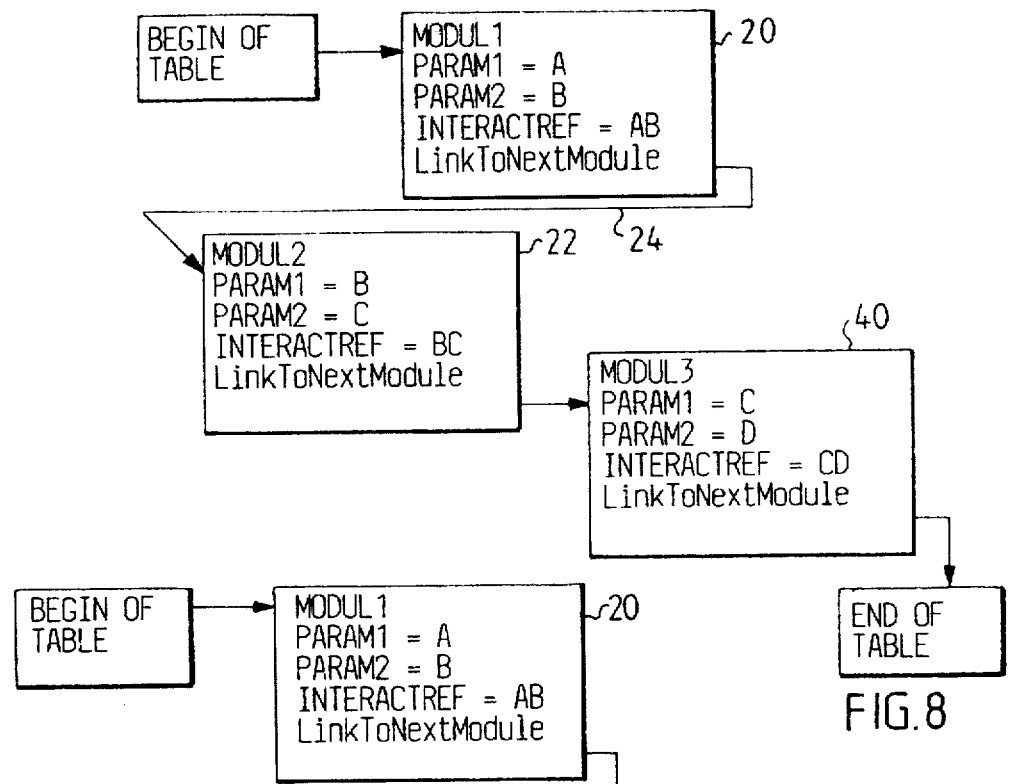

A further alternative flow path designated 48 in FIG. 7, takes care of the case likewise deviating from the preceding example, that a module is found, which fulfils the condition according to step 34. In this case the new module, i.e. Modul 3 according to FIG. 8, is likewise linked in, according to step 50, before the already existing module found according to the flow path 48.

The flow diagram according to FIG. 7 will be run through also when the interaction supplementary function BD is installed. When the interaction supplementary function is installed in the telecommunication system it calls the interaction table with the parameters Inparam1=B, Inparam2=D, Inref=BD. In this case the table in FIG. 8 is a starting point, implying that the flow diagram according to FIG. 7 after step 32 will follow the flow 42, since there is already a module, viz. Modul 2, 22, fulfilling the condition in step 30. The new module, designated 52 in FIG. 9, will therefore be linked in before the module 40 according to step 46 in the flow diagram.

Figure 10:
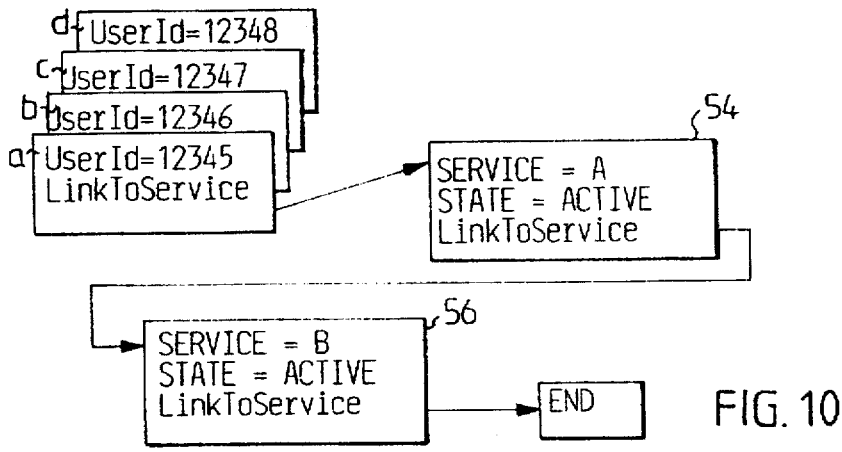

The table with information regarding subscriber supplementary functions has the structure shown in FIG. 10. As in FIG. 3 four users a–d are shown as an example. Each user has a row in the table identifying the user with the value of an identification parameter UserId. As appears the users a–d have the parameter values 12345, 12346, 12347 and 12348, respectively. In the table there is furthermore for each user a row indicating a link to supplementary function, "LinkToService". Since in the present case the user 12345 is the current one, supplementary functions A and B are included, blocks 54 and 56, respectively. Each supplementary function includes a parameter Service on the first row in the table, the value of which indicates the designation of the supplementary function, i.e. in the present case A and B, respectively. The next row includes a state parameter State, the value of which indicates if the supplementary function is active or not, i.e. passive. In the present case this parameter value indicates an active state, "Active", for both supplementary functions.

Figure 11:
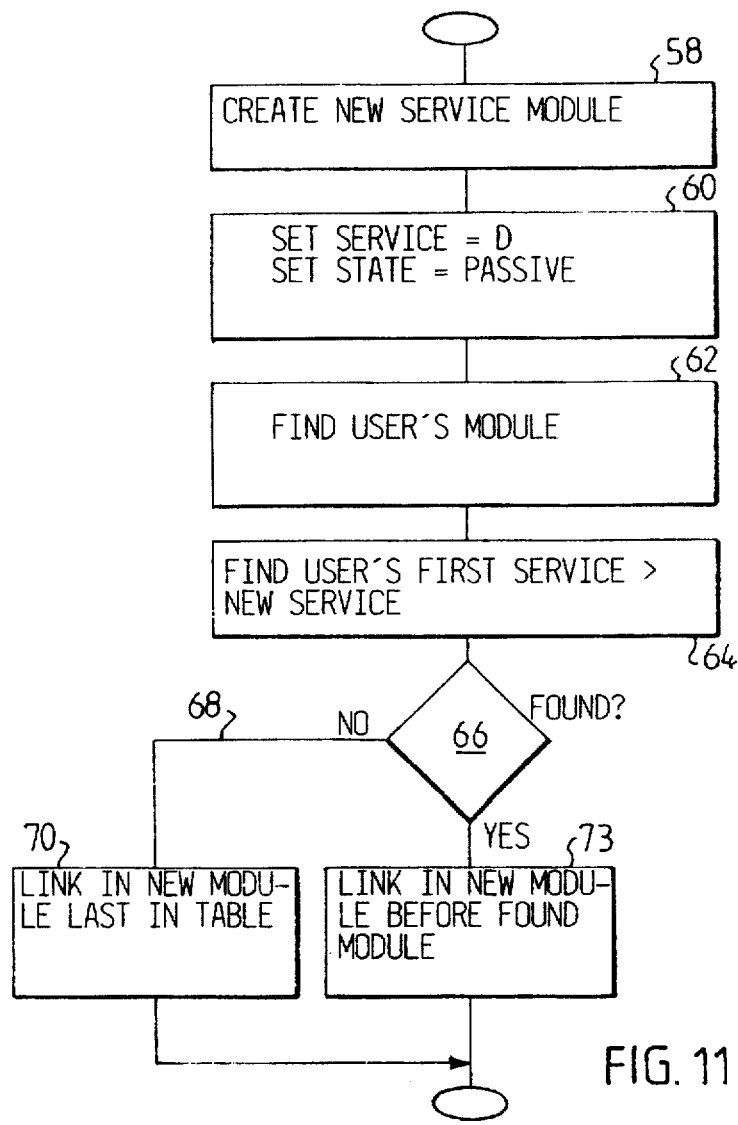

Starting from the state shown in FIG. 10 for the user 12345, assignment of the supplementary function D to the subscriber will be described more closely with reference to FIG. 11, i.e. the subscriber signs a subscription on the supplementary function D. In the first step designated 58 in FIG. 11, the creation of the new supplementary function module is started. In the following step 60 the value D is assigned to the parameter Service, and the value Passive is assigned to the parameter State. When assigning a new supplementary function it is always set to passive from start.

In step 62 the module of the user 12345 is called. In step 64 the value of the parameter Service of the new supplementary function module D is compared to the value of the same parameter of the existing supplementary function modules A and B. The value D is assumed to be greater than the values A and B, implying that the result of the comparison, step 66, states that the flow line designated 68 shall be followed, where according to step 70 the new supplementary function module is linked in last in the table according to FIG. 10, which gives the result shown in FIG. 12, where the new supplementary function module is designated 72.

If, as an example, the supplementary function is smaller, the new module is linked in before the found module according to step 73.

Figure 12:
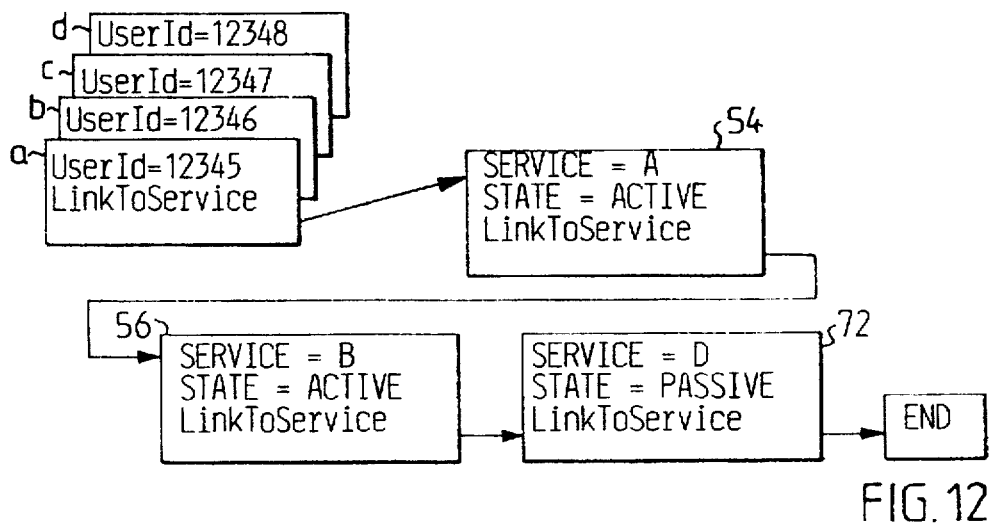
Figure 13:
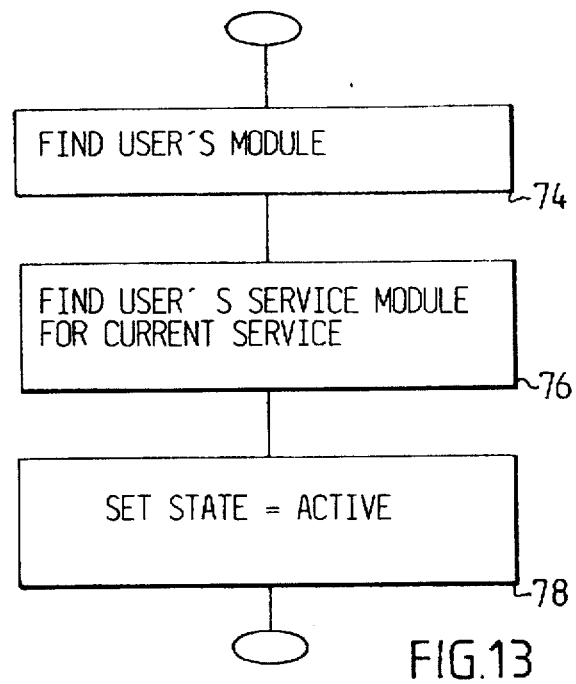

In FIG. 12 the parameter "State" has the value "Passive" in the module 72, as has been mentioned. The flow shown in FIG. 13 is run through in the supplementary function D when it shall be activated. In the first step, step 74, the user module 12345 is called. In the next step 76 the module 72 of the user is called for the supplementary function D. In step 78 finally the value of the parameter "State" is set to indicate an active state, "Active". The result, i.e. the difference with respect to FIG. 12, is emphasized in FIG. 14 by the designation of the module for the supplementary function D having been changed to 72'. With reference to FIGS. 15a and 15b the steps will now be described which are run through by the basic function 2 if the subscriber 12345 initiates a call in the telecommunication system in question.

Figure 9:
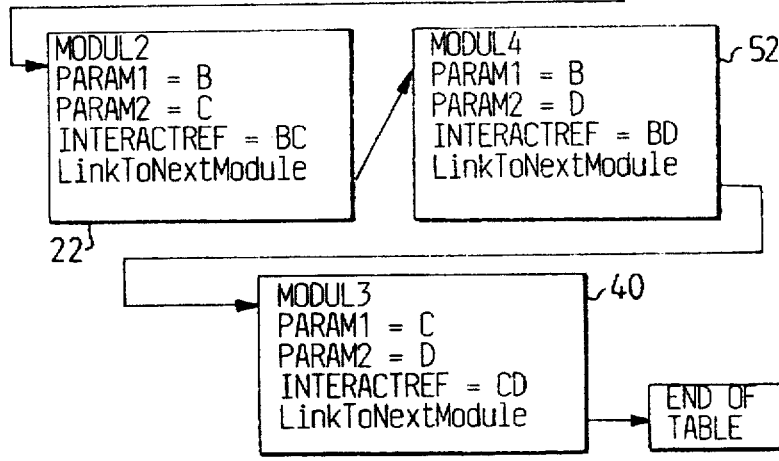
Figure 14:
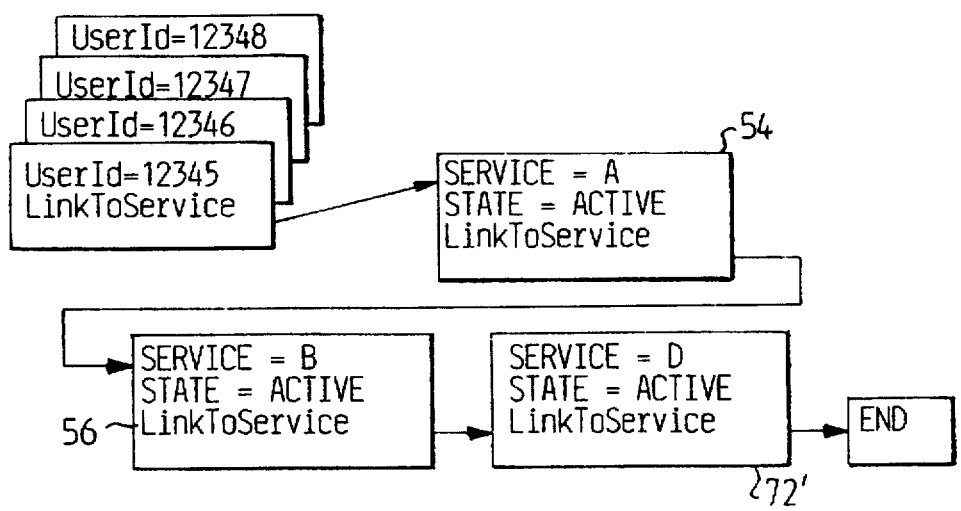
Figure 15A:
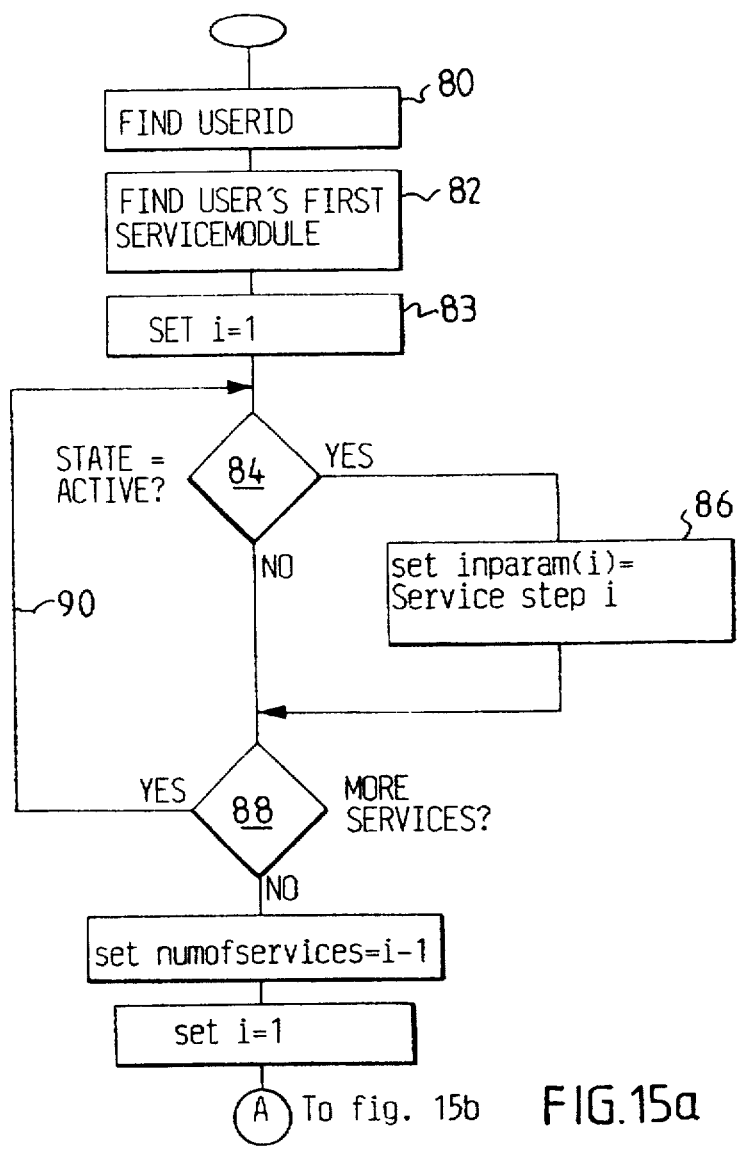
FIG. 15a shows a first part of a flow diagram run through in a basic function when a subscriber initiates a call.
Figure 15B:
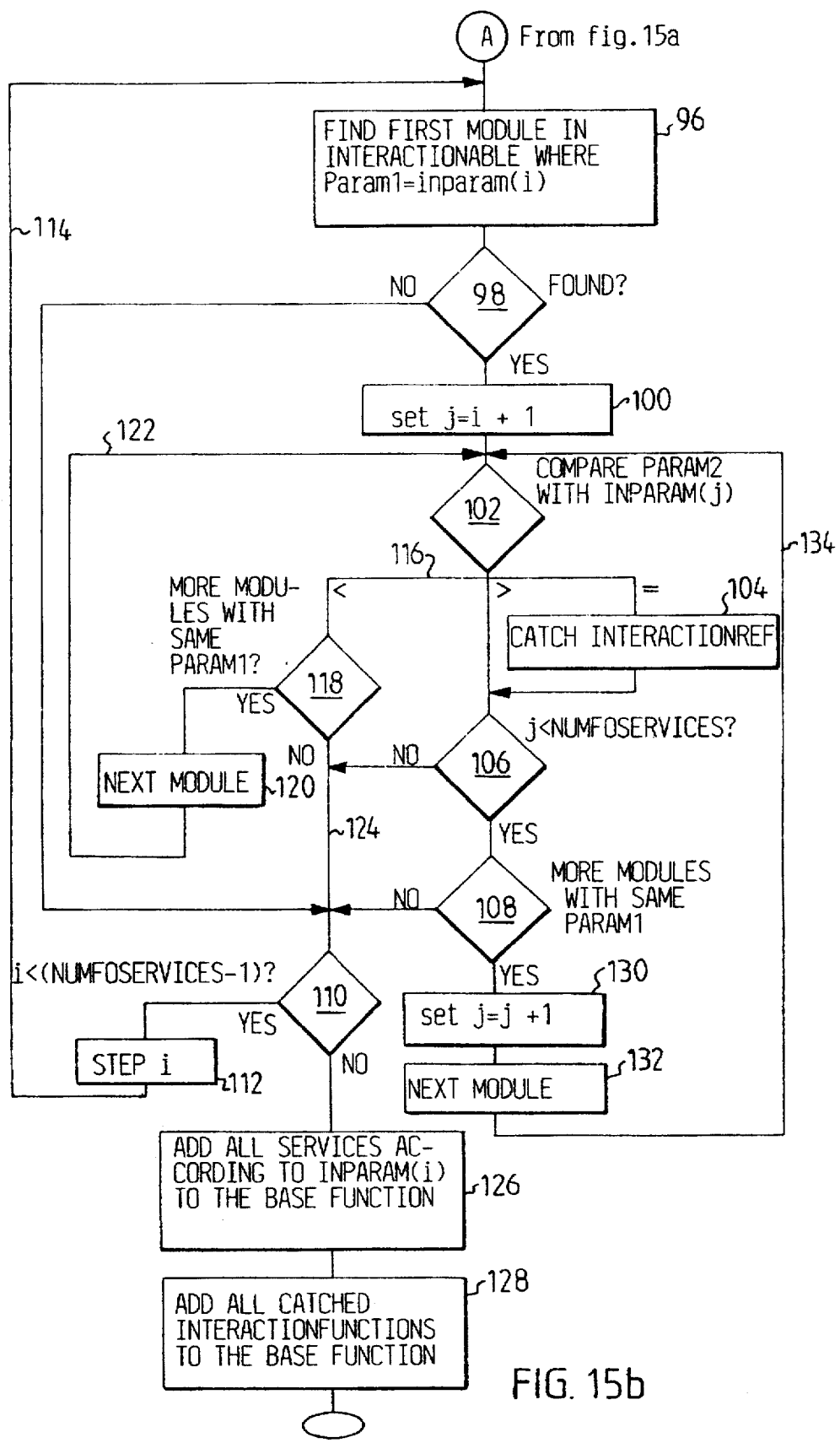
FIG. 15b shows a second part of the same flow diagram.

According to the invention only the supplementary functions and interaction supplementary functions which may be possible in the telecommunication case in question will be connected, which is carried through by means of table information, which according to FIG. 14 includes subscriber information for each subscriber with respect to the supplementary functions subscribed to by the user, and state information for each supplementary function subscribed to with respect to whether the function in question takes an active or passive state, and according to FIG. 9 includes information with respect to interaction supplementary functions which are of interest for being used for a given set of supplementary functions. According to FIG. 14 the subscriber 12345 has the supplementary functions A, B and D, all three of which are active. According to FIG. 9 the interaction supplementary functions AB and BD are of interest for being used.

In the first step in FIG. 15a, step 80, the subscriber is looked for by means of the subscriber identification 12345. In step 82 the first supplementary function of the subscriber is looked for. When it has been found, in step 83, an enumeration parameter i for the supplementary service functions of the subscriber is set to 1. In step 84 it is investigated whether the parameter "State" indicates an active or passive state. If the state is indicated as active, which is true in the present case, information regarding the active services of the subscriber 12345 is stored in the parameter Inparam(i)= Service, in step 86. The first value of i is 1, implying that in step 86 information regarding the supplementary function A according to module 54 in FIG. 14 is stored. In step 88 it is investigated whether more supplementary functions are of interest. Since in the present case according to FIG. 14 two further supplementary functions are of interest, viz. B and D, the flow goes back via the flow line 90 to step 84 for storing the information regarding these further functions in step 86 after each other.

It appears from FIG. 15a that in case a subscriber would like to subscribe to a supplementary function not activated, this will be sorted out in step 84, and will therefore not be added to the basic function for execution.

In a first step 96 in FIG. 15b the first module in the table for interaction supplementary functions in FIG. 9 where the parameter Param1 is equal to the input parameter Inparam(i) is looked for. In the present case it may be imagined that the input parameter is A for the corresponding supplementary function. In step 98 it is observed that the parameter has been found, which results in introducing the input parameter Inparam(j) in step 100 by j=i+1. In the present case Inparam (j) will then be B for the corresponding supplementary function. In Modul 1 the parameter Param2=B, which leads to step 104, wherein the parameter Interactref=AB is caught, i.e. it is observed that the interaction supplementary function AB is included in the case in question.

This leads to step 106 in which more input parameters are asked for, by "j<numofservices?", i.e. if j is less than the total number of supplementary services, and to the step 108 in which modules with the same parameter value Param1 are asked for, i.e. A in the present case. The answer is yes in the first case, since D remains, and no in the second case, since A is the value of Param1 in module 52. This leads to step 110, in which it is asked if the value of i in question, i.e. 1 in the present case, is less than the number of supplementary functions −1. The answer is yes, since the number of supplementary functions is 3, viz. the supplementary functions A, B and D. In step 112 step forward to 2 is performed.

Via the flow line 114 the flow now goes back to step 96, in which the first module now is asked for, in which Param1=inparam(i=2). With reference to FIG. 9 this leads to the module 22 and the parameter value B. In step 100 j is set to 3 since i=2. In step 102 Param2 in module 22, i.e. the value C, is compared to the value of inparam(3), i.e. D in the case in question. C is here less than D, which via the flow line 116 leads to step 118, in which more modules having the same value of Param1 are asked for. Since also in module 52 Param1 has the value B, this leads via step 120 and the flow line 122 back to step 102. In this step it is now observed that Param2 in the module 52 has the value D, this being the same as the value of inparam(3).

The flow now goes back to step 104, in which the parameter Interactref=BD of the module 52 is caught. In step 106 it is now observed that j=3 not is less than the total number of supplementary services. This leads via the flow lines 124 to the step 110 in which it is observed that the set condition is no longer fulfilled.

This in turn leads to the steps 126 and 128. In step 126 all supplementary services are added to the basic function 2 according to Inparam(i). In step 128 all caught interaction supplementary functions are added to the basic function.

In FIG. 15b steps 130 and 132 and the flow line 134 take care of the case, not being described here, that the answer in steps 106 and 108 is yes in both cases at some instant of the passage through the flow diagram.

What is claimed is:

1. In a telecommunication system having functionality including basic functionality, supplementary functionality containing optional supplementary functions associated with said basic functionality, and interaction supplementary functionality containing functions for solving interaction problems in case several supplementary functions interact, a method for adding supplementary functions and interacting supplementary functions needed in a current communication case initiated by a subscriber subscribing to basic functions and supplementary functions in said system, comprising the steps of adding, in real time, only those supplementary functions and interaction supplementary functions which can be possible for use in the current communication case using table information including:
subscriber information for each subscriber relating to supplementary functions to which the subscriber has subscribed,
state information for each supplementary function subscribed to relating to whether the function takes an active or a passive state, and
information regarding interaction supplementary functions which should be used together with a given set of supplementary functions.

2. A method according to claim 1, comprising using said table information in the form of two tables, one for the subscriber and state information, and one for the information regarding interaction supplementary function.

3. A method according to claim 1, further comprising the steps of a. establishing an identity of said subscriber,
b. using the identity for reading said subscriber information and state information for finding the subscriber active supplementary functions for use in said current communication case,
c. using the active supplementary functions found for reading said information regarding interaction supplementary functions for finding interaction supplementary functions for said current communication case,
d. adding the active supplementary functions found to the basic functionality with which said active supplementary functions found are associated,
e. adding the interaction supplementary functions found to the basic functionality with which said interaction supplementary functions found are associated, and
f. executing said current communication case.

4. A method according to claim 3, comprising performing steps d. and e. after step c.

5. A method according to claim 3 comprising performing steps b. and d. before steps c. and e.

6. In a telecommunication system having functionality including basic functionality, supplementary functionality containing optional supplementary functions associated with said basic functionality, and interaction supplementary functionality containing functions for solving interaction problems in case several supplementary functions interact, an apparatus for adding supplementary functions and interacting supplementary functions needed in a current communication case initiated by a subscriber subscribing to basic functions and supplementary functions in the telecommunication system, comprising:

first means for adding, in real time, only those supplementary functions and interaction supplementary functions which can be possible for use in the current communication case; and
a memory, in communication with the first adding means, for storing a table of information that includes:
subscriber information for each subscriber relating to supplementary functions to which the subscriber has subscribed,
state information for each supplementary function subscribed to relating to whether the function takes an active or a passive state, and
information regarding interaction supplementary functions which should be used together with a given set of supplementary functions.

7. The apparatus of claim 6, wherein the memory stores the table of information as a first table of subscriber and state information and a second table of information regarding interaction supplementary functions.

8. The apparatus of claim 6, further comprising:
means for establishing an identity of the subscriber;
first means for using the identity for reading the subscriber information and state information and for finding the subscriber active supplementary functions for use in the current communication case;
second means for using the active supplementary functions found by the first using means for reading the information regarding interaction supplementary functions and for finding interaction supplementary functions for the current communication case;
second means for adding the active supplementary functions found by the first using means to the basic functionality with which the active supplementary functions found are associated;
third means for adding the interaction supplementary functions found by the second using means to the basic functionality with which the interaction supplementary functions found are associated; and
means for executing the current communication case.

9. The apparatus of claim 8, wherein the user's active supplementary functions are found and added to the basic functionality before the user's interaction supplementary functions are found and added to the basic functionality.

10. A telecommunication system, including a plurality of services including basic services, supplementary services that are associated with and modify the basic services, and interaction supplementary services which modify the supplementary services allowing the supplementary services to function together when they are simultaneously activated, said system comprising:

means for identifying the user;

means for identifying which supplementary services the user subscribes to;

means for determining the state of each identified supplementary service as passive or active for a current communication case initiated by the user;

means for determining only the interaction supplementary services corresponding to the identified supplementary services that are active; and means for adding to the basic services the active identified supplementary services and the corresponding interaction supplementary services.

11. The system of claim 10 further comprising:

a memory for storing a table of information that includes:
- information for each user relating to supplementary services to which the user has subscribed;
- state information for each supplementary service subscribed to relating to whether the supplementary service takes an active or a passive state; and
- information regarding interaction supplementary services which should be used together with a given set of supplementary services, wherein
- the user identifying means, the supplementary service identifying means, the interaction supplementary service determining means, and state determining means make their decisions based on the information stored in the table.

12. The system of claim 11, wherein the memory stores the table of information as a first table of user and state information and a second table of information regarding interaction supplementary services.

13. In a telecommunication system, including a plurality of services including basic services, supplementary services that are associated with and modify basic services, and interaction supplementary services which modify supplementary services allowing the supplementary services to function together when they are simultaneously activated and a memory for storing a table of information that includes, information for each user relating to supplementary services to which the user has subscribed; state information for each supplementary service subscribed to relating to whether the function takes an active or a passive state, and information regarding interaction supplementary services which should be used together with a given set of supplementary services, a method for adding supplementary and interactive supplementary services comprising the steps of:

identifying the user;

accessing said table to identifying which supplementary services the user subscribes to and the state of each identified supplementary service for a current communication by the user;

accessing said table to determine which interaction supplementary services are needed for the identified supplementary services that are active; and adding to the basic services the active identified supplementary services and the determined interaction supplementary services.

14. The system of claim 13, wherein the memory stores the table of information as a first table of user and state information and a second table of information regarding interaction supplementary services.

* * * * *